United States Patent
Theiss

(10) Patent No.: US 10,731,775 B2
(45) Date of Patent: Aug. 4, 2020

(54) SYSTEM AND METHODOLOGY FOR INDICATING POSITION

(71) Applicant: OneSubsea IP UK Limited, London (GB)

(72) Inventor: David Harold Theiss, Tomball, TX (US)

(73) Assignee: OneSubsea IP UK Limited, London (GB)

( * ) Notice: Subject to any disclaimer, the term of this patent is extended or adjusted under 35 U.S.C. 154(b) by 149 days.

(21) Appl. No.: 15/825,624

(22) Filed: Nov. 29, 2017

(65) Prior Publication Data

US 2019/0162329 A1 May 30, 2019

(51) Int. Cl.
| | | |
|---|---|---|
| F16K 37/00 | (2006.01) | |
| E21B 34/04 | (2006.01) | |
| F16K 31/50 | (2006.01) | |
| E21B 41/04 | (2006.01) | |
| F16D 7/00 | (2006.01) | |

(52) U.S. Cl.
CPC .......... F16K 37/0008 (2013.01); E21B 34/04 (2013.01); E21B 41/04 (2013.01); F16D 7/00 (2013.01); F16K 31/504 (2013.01)

(58) Field of Classification Search
CPC ..... F16K 37/0008; F16K 31/504; E21B 41/04
USPC ...................... 137/551, 556, 556.3
See application file for complete search history.

(56) References Cited

U.S. PATENT DOCUMENTS

| | | | | |
|---|---|---|---|---|
| 2,930,344 A * | 3/1960 | Brasel | ................. | F16K 37/0008 116/277 |
| 3,254,669 A * | 6/1966 | Perlman | ................ | F16K 11/087 116/277 |
| 4,235,258 A * | 11/1980 | Uno | .................... | F16K 37/0008 137/556 |
| 5,083,743 A | 1/1992 | Gordon et al. | | |
| 8,382,415 B1 * | 2/2013 | Goldbaum | ............ | F16B 39/122 411/366.1 |
| 8,852,004 B2 * | 10/2014 | D'Silva | .................... | F16D 7/00 464/38 |

(Continued)

FOREIGN PATENT DOCUMENTS

DE    29704960 U1    4/1998

OTHER PUBLICATIONS

Oliver Valvetek, "Position Indicator for 10 Turn Equipment, Apl17D Class 3 With Horizontal Mounting and Right Hand Indicator Position (Bucket Supplied by Others)", TA3722-4, 2007, 1 page.

(Continued)

Primary Examiner — Angelisa L. Hicks
(74) Attorney, Agent, or Firm — Helene Raybaud

(57) ABSTRACT

A technique facilitates continued operation of a position indicator which may be used with a valve or other types of actuatable components. The technique utilizes a housing and a stem driver mounted for rotation within the housing to actuate the valve/component to a desired position. The stem driver has a threaded region which is threadably engaged with a clutch collar located in the housing. When the stem driver is rotated relative to the clutch collar, the clutch collar moves in an axial direction along the interior of the housing. The clutch collar is coupled with a bracket which moves during axial translation of the clutch collar. The clutch collar comprises a flexible portion which enables slippage of threads at the region of coupling between the clutch collar and the stem driver if movement of the bracket becomes sufficiently restricted.

17 Claims, 4 Drawing Sheets

(56) References Cited

U.S. PATENT DOCUMENTS 9,920,842 B1 3/2018 Karani
2013/0248001 A1 9/2013 Young

OTHER PUBLICATIONS

Oberg et al., "Rolled Threads for Screw Shells of Electric Sockets and Lamp Bases-American Standard" found on p. 1360 of Machinery's Handbook, 22nd Edition, 1984.
Extended European Search Report issued in European Patent Appl. No. 18209224.7 dated Mar. 22, 2019; 7 pages.

* cited by examiner

SYSTEM AND METHODOLOGY FOR INDICATING POSITION

BACKGROUND

In many types of subsea operations, rotary actuated valves are used to control a fluid flow. A rotary actuated valve system comprises a valve coupled with an actuation system which includes a flag or other position indicator to indicate valve flow position. The valve position indicator is mechanically moved in correspondence with the flow position of the valve to provide a visual indication of the valve flow position. If movement of the valve position indicator is sufficiently restricted, a shear pin or similar one-time failure point disengages the valve position indicator to enable continued use of the valve actuation system. Subsequently, however, the valve position indicator becomes permanently disabled unless the rotary actuated valve system is retrieved to the surface to replace the shear pin or other failed component.

SUMMARY

In general, a system and methodology are provided for facilitating continued operation of a position indicator which may be used with a valve or other types of actuatable components. The technique utilizes a housing and a stem driver mounted for rotation within the housing to actuate the valve/component to a desired position. The stem driver has a threaded region which is threadably engaged with a clutch collar located in the housing. When the stem driver is rotated relative to the clutch collar, the clutch collar moves in an axial direction along the interior of the housing. The clutch collar is coupled with a bracket which moves during axial translation of the clutch collar. The clutch collar comprises a flexible portion which enables slippage of threads at the region of coupling between the clutch collar and the stem driver if movement of the bracket becomes sufficiently restricted. In some embodiments, the bracket is part of a position indicator which indicates operational position of the valve/component. In this manner, operation of the stem driver to adjust the position of the valve/component may be continued without permanently disabling the position indicator. If the condition restricting movement of the position indicator can be mitigated, the position indicator may be restored to functionality by actuating the valve/component to an end of stroke position to reset the position indicator.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
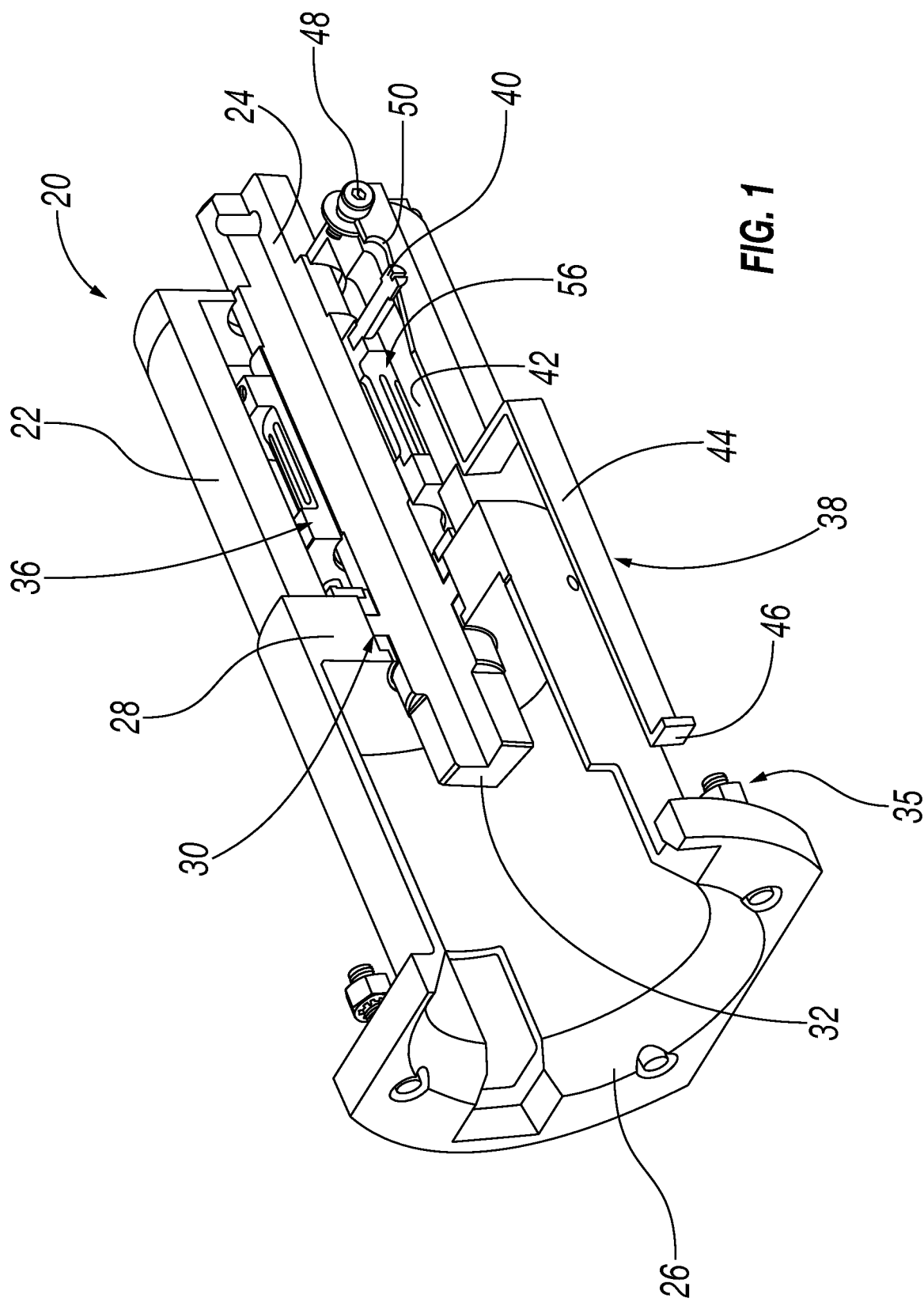
FIG. 1 is a partially cutaway view of an example of a component actuation system, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a system and methodology for facilitating continued operation of a position indicator. Position indicators may be used in a variety of subsea operations to provide visual indications of operational positions of corresponding components. For example, a flag bracket or other type of position indicator may be used with a subsea valve actuation system to provide an indication of the flow position of the corresponding valve.

In such applications, the valve may be actuated by a stem driver which is rotated to shift the valve between different flow positions. The position indicator effectively tracks rotations of the stem driver, thus providing an indication of the flow position of the corresponding valve. For example, the position indicator may be used to provide a visual indication as to whether the valve is in an open flow position or a closed flow position.

According to an embodiment, the technique described herein may utilize an actuation system comprising a housing and a stem driver mounted for rotation within the housing to actuate the valve (or other actuatable component) to a desired position. The stem driver has a threaded region which is threadably engaged with a clutch collar located in the housing. When the stem driver is rotated relative to the clutch collar, the clutch collar moves in an axial/linear direction along the interior of the housing. The clutch collar is coupled with a position indicator, e.g. a flag bracket, which moves during axial translation of the clutch collar to indicate the operational position of the valve/component resulting from rotation of the stem driver. By way of example, the position indicator may be pivotably mounted and pivoted between different position indicator locations as the clutch collar is moved linearly via rotation of the stem driver.

According to this embodiment, the clutch collar further comprises a flexible portion which enables slippage of threads at the region of coupling between the clutch collar and the stem driver if movement of the position indicator becomes sufficiently restricted. In this manner, operation of the stem driver to adjust the position of the valve/component may be continued without permanently disabling the position indicator. If the condition restricting movement of the position indicator can be mitigated, the position indicator may be restored to functionality by actuating the valve/component to an end of stroke position to reset the position indicator.

Depending on the parameters of a given operation and environment, the clutch collar may be constructed as a follower nut made of or including an elastic material. For example, the clutch collar may be constructed from an elastic material, e.g. an elastic metallic material, having slots, e.g. axial slots, to provide a desired level of flexibility and elasticity.

Additionally, the clutch collar may have clutch threads shaped to enable slippage of the clutch threads with respect to the corresponding threaded region along the stem driver if the position indicator becomes bound. For example, the clutch threads (as well as the threads along the stem driver) may be rounded so as to slip past each other at a predetermined torque value acting on the stem driver when movement of the position indicator becomes restricted. The torque level which causes the clutch threads to jump along the stem driver threads may depend on a variety of factors such as thread profile, friction, and stiffness of the flexible portion of the clutch collar.

Once movement of the position indicator becomes sufficiently restricted, the flexible portion of the clutch collar allows radial expansion such that the female clutch thread profile expands and the clutch threads jump or slip along the threads of the stem driver in a fully elastic and repeatable manner. If the condition that bound the position indicator can be mitigated, the position indicator can be restored to full functionality by actuating the valve/component to an end of stroke position. During this transition, the female clutch threads jump along threads of the stem driver until the clutch collar and connected position indicator are reset to a proper, initial calibrated position.

In some embodiments, the clutch collar comprises a flexible portion made of an elastic metallic material with a low modulus, e.g. aluminum, bronze, titanium. However, the flexible portion also may be made of elastic, nonmetallic materials such as polyetheretherketone (PEEK) or other suitable plastics providing the desired flexibility and elasticity. The flexible portion of the clutch collar also may be constructed with various types of axial slots to provide a desired level of flexibility and elasticity in a radial direction.

Additionally, the shape and size of the clutch threads as well as the threads on the stem driver may be selected according to the desired torque level for causing slippage of the threads past one another. Examples of threads for use in some types of operations include rolled threads (see, for example, "Rolled Threads for Screw Shells of Electric Sockets and Lamp Bases-American Standard" found on page 1360 of Machinery's Handbook, $22^{nd}$ Edition); knuckle threads (see DIN 405); and dairy coupling threads (see DIN 11851).

Referring generally to FIG. 1, an example of a component actuation system 20 is illustrated. In this embodiment, the component actuation system 20 comprises a housing 22 and a stem driver 24 rotatably mounted such that the stem driver 24 may be rotated within the housing. In the example illustrated, the housing 22 comprises or is coupled with a bucket 26 having a base 28; and the stem driver 24 is rotatably mounted in the base 28 via a bearing 30. However, a suitable bearing or bearings 30 may be mounted at various positions along housing 22 (and/or along adjacent components) to enable rotation of stem driver 24 within housing 22.

By way of example, the bucket 26 may be sized and shaped for receiving a manipulator arm which engages a driving end 32 of the stem driver 24 to rotate the stem driver. According to an embodiment, the bucket 26 may be sized to receive a driver tool of a remotely operated vehicle (ROV) which can be used to engage the driving end 32 and to rotate stem 24 for actuation of an adjacent component 34 (see FIG. 2). However, the stem driver 24 may be selectively rotated via a variety of other types of driving tools. It should be noted the bucket 26 also may comprise a fastening mechanism 35, e.g. bolts or other fasteners, by which the component actuation system 20 may be mounted to another component or assembly.

In the example illustrated, the component actuation system 20 also comprises a clutch collar 36 located within the housing 22 and threadably engaged with stem driver 24. The component actuation system 20 further comprises a position indicator 38 mounted, for example, adjacent the housing 22 and movable between indicator locations so as to indicate an actuation position of the corresponding component 34. As illustrated, the position indicator 38 may be coupled to clutch collar 36 via a pin 40 (or pins 40) extending generally radially through a corresponding slot 42 (or slots 42) through a wall of housing 22 surrounding the clutch collar 36. With pins 40 extending through slots 42 of housing 22, rotation of clutch collar 36 is prevented. Thus, the stem driver 24 may be rotated relative to clutch collar 36 while clutch collar 36 is held rotationally stationary.

In some embodiments, the position indicator 38 may be in the form of a flag bracket 44 having a flag 46 movable to different positions to visually indicate the position of clutch collar 36 along stem driver 24. The flag bracket 44 may be formed of metal or another suitable material. The position of clutch collar 36 along stem driver 24 corresponds with the actuation position of component 34. Regardless of the specific form of position indicator 38, the position indicator 38 is movable between different visible locations which correspond with actuation positions of the actuatable component 34.

The position indicator 38 may be movable between indicator locations via a variety of mechanisms. One approach is to pivotably mount the position indicator 38 to housing 22 or to a suitable adjacent component via a pivot pin 48. In the example illustrated, the flag bracket 44 comprises a flag slot 50 which is misaligned with the corresponding housing slot 42. For example, the housing slot 42 may be oriented generally in an axial direction and the corresponding flag slot 50 may be oriented at an angle with respect to the axial direction. Because of the misaligned slots 42, 50, movement of pin 40 along housing slot 42 (as clutch collar 36 is moved along stem driver 24) causes the flag bracket 44 to pivot about pivot pin 48 and to thus move flag 46 to different indicator locations.

Figure 2:
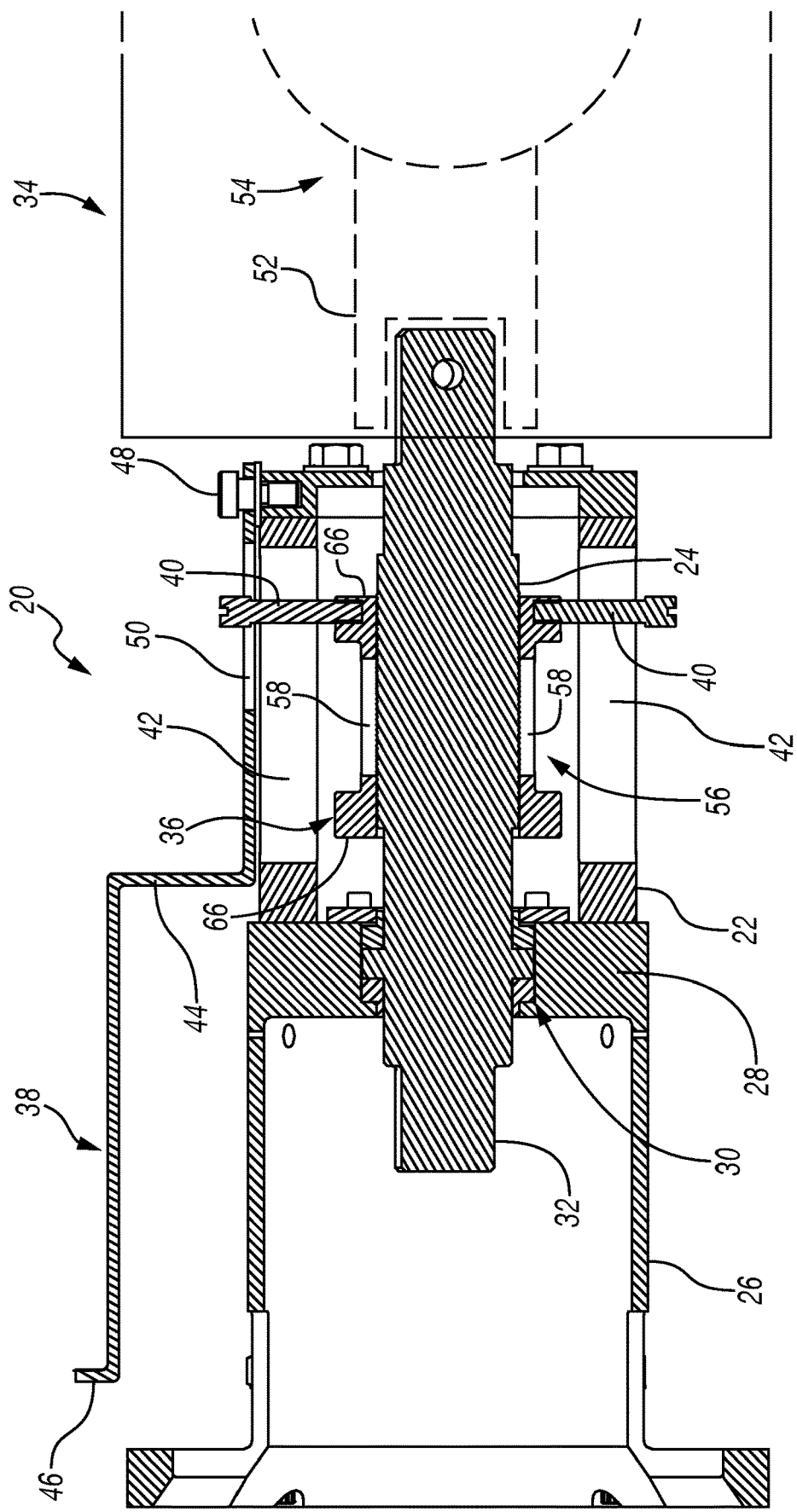
FIG. 2 is a cross-sectional illustration of an example of a component actuation system coupled to an actuatable component, according to an embodiment of the disclosure.

With additional reference to FIG. 2, the stem driver 24 may be engaged with a corresponding driven member 52 of actuatable component 34. By way of example, the actuatable component 34 may be in the form of a subsea component, such as a subsea valve 54 which may be actuated to different flow positions via rotation of stem driver 24. When stem driver 24 is rotated to actuate a given component 34, the threaded engagement with clutch collar 36 causes the clutch collar 36 as well as the pins 40 coupled with clutch collar 36 to move linearly along the housing slots 42. In other words, clutch collar 36 is held against rotation via pins 40 so the relative rotation of stem driver 24 forces the clutch collar 36 and pins 40 to move linearly/axially along slots 42.

The linear movement of the pin 40 coupled with position indicator 38 causes the position indicator 38 to move to different locations which correspond to the actuation position of component 34. For example, the pin 40 may be moved along flag slot 50 so as to pivot the flag bracket 44 to different positions corresponding with different flow positions of subsea valve 54. Depending on the parameters of a given operation and environment, the number of housing slots 42, pins 40, and position indicators 38 may vary.

Figure 4:
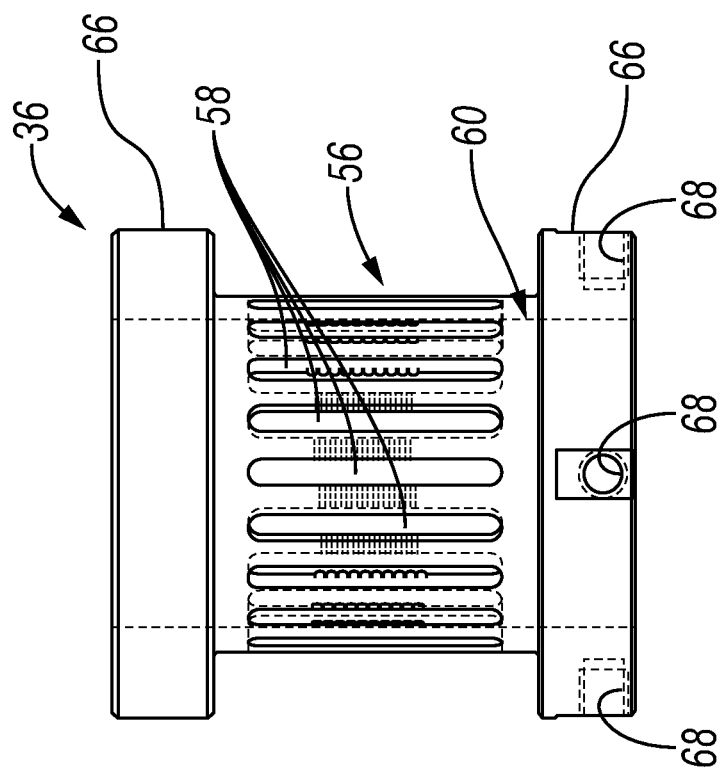
FIG. 4 is a front view of the clutch collar illustrated in FIG. 3, according to an embodiment of the disclosure.
Figure 3:
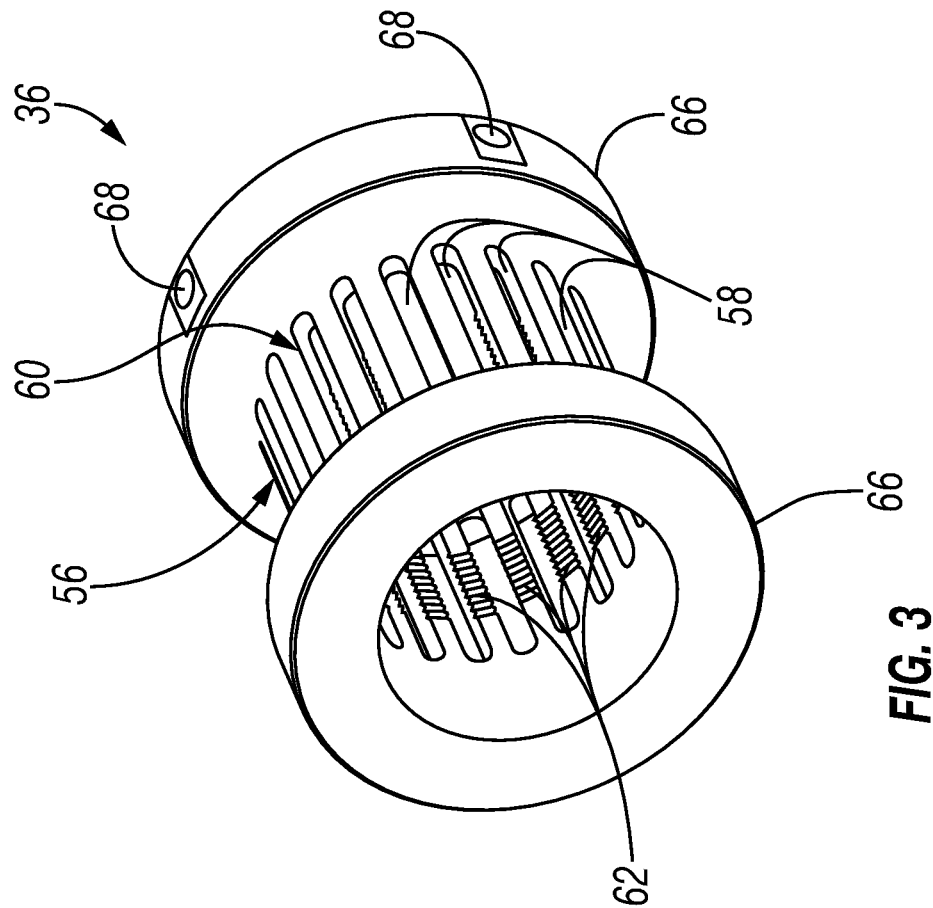
FIG. 3 is an orthogonal view of an example of a clutch collar which may be used within a component actuation system such as the component actuation system illustrated in FIG. 1, according to an embodiment of the disclosure.

Referring generally to FIGS. 3 and 4, an embodiment of clutch collar 36 is illustrated. In this example, clutch collar 36 comprises a flexible portion 56 having a desired flexibility and elasticity to enable radially outward flexing. By way of example, the flexible portion 56 may be constructed with a plurality of slots 58, e.g. generally axial slots, formed through a generally cylindrical wall 60 of the flexible collar 36. The flexible portion 56 may be formed of a metal material or from another suitable material having a desired flexibility and elasticity.

As illustrated in FIG. 3, the clutch collar 36 comprises clutch threads 62 which may be formed along an interior of flexible portion 56. The clutch threads 62 may be oriented for engagement with a threaded region 64 of stem driver 24 (see FIG. 5). In the example illustrated, the flexible portion 56 extends between radially expanded portions 66, e.g. hubs, of the clutch collar 36 to effectively form an elastic follower nut. At least one of the radially expanded portions 66 may comprise recesses 68 or other mechanisms for secure coupling with corresponding pins 40.

Figure 5:
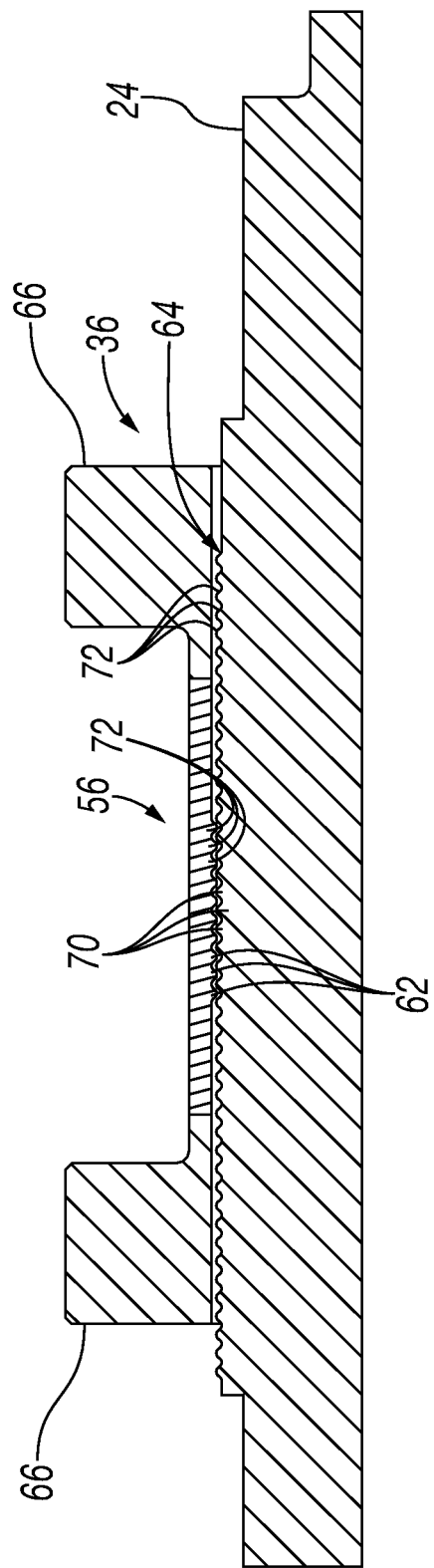
FIG. 5 is a cross-sectional illustration of an example of a clutch collar coupled with a stem driver, according to an embodiment of the disclosure.

With additional reference to FIG. 5, the flexible portion 56 and clutch threads 62 are constructed to release from threaded region 64 upon sufficient resistance to movement of position indicator 38 which, in turn, resists axial movement of clutch collar 36. The flexible portion 56 effectively enables slippage of clutch threads 62 with respect to driver threads 70 of threaded region 64 at the region of coupling between clutch collar 36 and stem driver 24. The thread slippage occurs if movement of the position indicator 38 becomes sufficiently restricted.

In this manner, operation of the stem driver 24 to adjust the position of the valve 54/component 34 may be continued without permanently disabling the position indicator 38. If the condition restricting movement of the position indicator 38 can be mitigated, the position indicator 38 may be restored to functionality by actuating the valve 54/component 34 to an end of stroke position to reset the position indicator 38 at a suitable indicator location representing the position of the valve 54/component 34.

The clutch threads 62 and the driver threads 70 may have thread profiles which cooperate with the flexibility of flexible portion 56 to enable slippage of threads upon occurrence of a predetermined torque acting on stem driver 24. By way of example, the clutch threads 62 and the driver threads 70 may each have rounded profiles 72. However, other types of profiles may be used to achieve thread slippage upon application of a predetermined torque.

In the event the position indicator 38 becomes bound along its bracket or drive linkage, the predetermined torque causes the clutch threads 62 and flexible portion 56 to expand radially outward so the clutch threads 62 can jump to the next thread profile of threaded region 64 in a fully elastic and repeatable manner. The torque which causes the threads 62, 70 to jump over each other is a factor of the thread profile, friction, and stiffness of the flexible portion 56.

The actuation system 20 may be used to actuate various types of subsea components 34 or other components. For example, the actuation system 20 may be coupled with various types of subsea valves 54 which are actuatable via rotation of stem driver 24 when stem driver 24 is coupled with the corresponding valve actuation mechanism. Depending on the type of component 34 and the environment in which it is operated, the component actuation system 20 may have various sizes, configurations, and materials. For example, various types of stem drivers 24 may be rotatably mounted in various types of bearings 30. Additionally, the clutch collar 36 may be formed as an elastic nut or in other suitable forms able to provide a flexible region 56 with a desired flexibility and elasticity.

It should be noted the clutch collar 36 may be used to perform functions other than indicating the position of component 34. For example, flag bracket 44 could comprise a variety of brackets such as an actuator linkage for actuating or triggering another device. The clutch mechanism 36 could be used for resetting the actuator linkage or for performing other desired functions. With position indicating applications, the position indicator 38 may comprise single or plural indicators having various forms and mounted for pivotable movement or other types of movement to provide visual indications of corresponding actuation positions.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for indicating position, comprising:
a housing having a housing slot;
a stem driver rotatably mounted for rotation within the housing, the stem driver having a threaded region;
a position indicator movably mounted adjacent the housing and having a position indicator slot oriented at an angle with respect to the housing slot;
a pin extending through the position indicator slot and the housing slot; and
a clutch collar located in the housing, the clutch collar being coupled with the pin and having a flexible portion with clutch threads threadably engaged with the threaded region such that rotation of the stem driver within the clutch collar causes the clutch collar and the pin to move linearly along the housing slot and the position indicator slot thus forcing the position indicator to different visible locations, the flexible portion having flexibility and elasticity to enable radially outward flexing of the flexible portion, thus allowing the clutch threads to release from the threaded region upon sufficient resistance to movement of the position indicator;
the clutch collar being coupled to a bracket, the clutch collar having a flexible portion with clutch threads threadably engaged to the threaded region such that rotation of the stem driver within the clutch collar causes the clutch collar to move linearly along the housing in a manner which forces the bracket to different positions, the flexible portion allowing the clutch threads to release and slip along the threaded region upon resistance limiting the movement of the bracket, wherein the stem driver is engaged with a valve operable between closed flow and open flow positions according to the linear position of the stem driver within the housing, wherein the bracket comprises a flag bracket movable via a pin extending through a housing slot formed in the housing and slidably received by a flag slot formed in the flag bracket, the flag slot being misaligned with the housing slot to cause movement of the flag bracket relative to the housing when the clutch collar is moved in an axial direction within the housing;

wherein the stem driver is engaged with a valve operable between closed flow and open flow positions according to the linear position of the stem driver within the housing;

wherein the bracket comprises a flag bracket movable via a pin extending through a housing slot formed in the housing and slidably received by a flag slot formed in the flag bracket, the flag slot being misaligned with the housing slot to cause movement of the flag bracket relative to the housing when the clutch collar is moved in an axial direction within the housing; and wherein the flag bracket is pivotably mounted to the housing.

2. The system as recited in claim 1, wherein the housing comprises a plurality of housing slots.

3. The system as recited in claim 2, further comprising a bucket coupled to the housing.

4. The system as recited in claim 1, wherein the position indicator comprises a flag bracket having a flag.

5. The system as recited in claim 1, wherein the position indicator pivots to indicate positions of a corresponding component.

6. The system as recited in claim 1, wherein the position indicator is pivotably mounted to the housing.

7. The system as recited in claim 1, wherein the flexible portion is formed as a cylindrical portion with slots to provide a desired flexibility in a radial direction.

8. The system as recited in claim 7, wherein the slots are axially oriented.

9. The system as recited in claim 1, wherein the clutch threads comprise threads having a rounded profile.

10. The system as recited in claim 1, further comprising a valve coupled to the stem driver and operable between flow positions via rotation of the stem driver.

11. A system, comprising:
a housing;
a stem driver rotatably mounted for rotation within the housing, the stem driver having a threaded region;
a clutch collar located in the housing, the clutch collar being coupled to a bracket, the clutch collar having a flexible portion with clutch threads threadably engaged to the threaded region such that rotation of the stem driver within the clutch collar causes the clutch collar to move linearly along the housing in a manner which forces the bracket to different positions, the flexible portion allowing the clutch threads to release and slip along the threaded region upon resistance limiting movement of the bracket, wherein the stem driver is engaged with a valve operable between closed flow and open flow positions according to the linear position of the stem driver within the housing, wherein the bracket comprises a flag bracket movable via a pin extending through a housing slot formed in the housing and slidably received by a flag slot formed in the flag bracket, the flag slot being misaligned with the housing slot to cause movement of the flag bracket relative to the housing when the clutch collar is moved in an axial direction within the housing;

wherein the flag bracket is pivotably mounted to the housing.

12. The system as recited in claim 11, wherein the clutch collar is cylindrical and the flexible portion comprises a plurality of axially oriented slots.

13. The system as recited in claim 11, wherein the clutch threads comprise threads having a rounded profile.

14. The system as recited in claim 13, wherein the threaded region comprises threads having a rounded profile.

15. A method, comprising:
threadably engaging a clutch collar with a stem driver via a threaded region such that the clutch collar moves in an axial direction relative to the stem driver when the stem driver is rotated relative to the clutch collar;
positioning the clutch collar in a housing;
coupling the clutch collar with a flag bracket located externally of the housing so as to cause movement of the flag bracket when the clutch collar moves in the axial direction relative to the stem driver;
connecting the stem driver to an actuatable component such that location of the flag bracket indicates an actuation position of the actuatable component; and
using a flexible portion of the clutch collar to enable thread slippage at the threaded region upon resistance limiting movement of the flag bracket while still enabling actuation of the actuatable component;

wherein the stem driver is engaged with a valve operable between closed flow and open flow positions according to the linear position of the stem driver within the housing;

wherein the bracket comprises the flag bracket movable via a pin extending through a housing slot formed in the housing and slidably received by a flag slot formed in the flag bracket, the flag slot being misaligned with the housing slot to cause movement of the flag bracket relative to the housing when the clutch collar is moved in an axial direction within the housing;

wherein the flag bracket is pivotably mounted to the housing.

16. The method as recited in claim 15, further comprising restoring functionality of the flag bracket after thread slippage at the threaded region by actuating the actuatable component to an end of stroke position to reset the flag bracket.

17. The method as recited in claim 15, wherein connecting comprises coupling the stem driver to an actuatable valve such that location of the flag bracket indicates an actuation position of the actuatable valve.

* * * * *